Patented July 24, 1923.

1,462,752

UNITED STATES PATENT OFFICE.

CHARLES B. JACOBS, OF WILMINGTON, DELAWARE, ASSIGNOR TO E. I. DU PONT DE NEMOURS & COMPANY, OF WILMINGTON, DELAWARE, A CORPORATION OF DELAWARE.

CARBON CATALYST.

No Drawing.   Application filed July 22, 1919. Serial No. 312,610.

*To all whom it may concern:*

Be it known that I, CHARLES B. JACOBS, a citizen of the United States, and a resident of Wilmington, in the county of New Castle and State of Delaware, have invented a certain new and useful Carbon Catalyst, of which the following is a specification.

This invention relates to a new form of carbon characterized by possessing chemical activity in a high degree; and to a process in which such carbon acts as a catalyst. This highly reactive carbon may be derived from the alkali-soluble constituents of wood or of other vegetable fibers such as cotton, esparto, straw, etc., by thermal decomposition.

In carrying out thermo-chemical reactions in general in which carbon is one of the active elements involved, it is always desirable to select a form of carbon as free from non-volatile or mineral impurities as practicable.

There is a wide variation in the chemical activity of the different varieties of amorphous carbon, the harder and denser varieties being much less active than the soft and more porous varieties.

In a general sense purity and chemical activity are closely related in the amorphous varieties of carbon; the purer the carbon used the greater is the speed and yield of the reaction as well as the purity of the product.

In such operations as the reduction of iron and various metals from their ores by carbon, the presence of certain non-volatile or mineral impurities such as silica, alumina, lime, etc., is more or less unimportant since these impurities are made to pass off in the slag and exert no deleterious effect upon the quality of the product, and for such operations relatively cheap forms of carbon, such as anthracite coal or coke from bituminous coal, constitute suitable forms of carbon for the purpose.

In the thermo-chemical treatment of alkali and alkali earth metal compounds with carbon, on the other hand, the presence of such impurities as silica, alumina, sulphur, phosphorus, iron, etc., in coal or coke not only detracts from the actual yield of the operation by forming undesirable side products with the alkali and alkali-earth metal compounds, but frequently results in the contamination of the finished product with impurities difficult or impossible to remove.

The reduction of zinc oxide to metallic zinc and the manufacture of certain grades of ultramarine, where the presence of even small quantities of iron prevents the production of the proper color in the finished material, are further instances of thermo-chemical operations in which the use of pure carbon is desirable.

Unfortunately, in many thermo-chemical operations of which the above cited examples serve as general illustrations, the use of the purer and more active varieties of carbon, such as charcoals from various woods and nut shells, petroleum coke, and cokes from the distillation residues of tars, bitumens, and pitches, which are practically free from non-volatile mineral impurities, is prohibited by the cost or inadequate supply of these forms of carbon.

In seeking a cheap and pure form of chemically active carbon to carry out my processes for producing alkali-metal cyanides, in which free or elemental nitrogen is caused to combine directly with carbon and alkali metal compounds to form alkali metal cyanides as described in my applications, Serial No. 279,801 and Serial No. 279,802, filed in the United States Patent Office, February 28, 1919, I have discovered a form of carbon which posessses remarkable catalytic properties and which is especially adapted for use in thermo-chemical reactions which involve carbon as a reactive element.

The principal object of my invention is to provide a new chemical reagent, that is, a substance adapted to be used in chemical reactions either as one of the main reacting materials or as a catalyst.

Another object of my invention is to improve on, and render more efficient, processes in which the chemical reactions between the main reacting materials are practically dependent upon the presence of an extended reaction surface such as is furnished by certain forms of carbon.

The principal source of my new chemical reagent is from the manufacture of wood pulp by the soda process where a mixture of carbon and calcium carbonate constitutes one of the waste products of the operation. Large quantities of the carbon may also be obtained in the purification of cotton and straw fibers. When derived from wood the carbon is produced in the following manner: The wood, either deciduous or coniferous, is digested with a solution of sodium hydroxide. This solution in reducing the wood to pulp combines with the incrusting substances of the wood, forming a series of soluble organic substances.

After the digestion is completed the pulp is blown into a tank equipped with a perforated bottom, and the so-called black liquor, containing the incrusting substances of the wood used in solution, is drained off. The pulp is also washed with hot water, and the washings added to the original liquor. This liquor is evaporated in a vacuum evaporator until it has attained a density of 35 to 40 degrees Baumé, when it is discharged to an incinerator. The incinerator is similar to the rotary furnaces usually employed in cement manufacture, lined with firebrick and equipped with a furnace at one end. It is rotated at a speed of about one revolution per minute. The thickened liquor from the evaporator enters the incinerator at the end opposite the furnace, and is met by the hot gases and flames from the same. As it works its way toward the outlet end it is further evaporated by the hot gases and is finally ignited by the flames from the furnace. If ordinary practice were followed at this point the ash as discharged from the incinerator containing from 10 to 15% of unburned carbon, resulting from the incineration of the soluble incrusting substances of the wood contained in the evaporated liquor, would be causticized with lime, the resulting mixture leached to remove most of the sodium hydroxide formed, and the residue comprising carbon mixed with calcium carbonate thrown away.

I have discovered that if the ash from the incinerator be first leached and washed with water to remove sodium carbonate and any other soluble materials that may be present, instead of being first causticized, there is obtained as a residue the above-described form of carbon characterized by possessing a chemical activity and power of adsorption in a remarkably high degree.

According to my process the ash is immediately conveyed from the incinerator to a leaching tank and here the soda ash formed from the caustic in the evaporation process, is dissolved and the carbon washed thoroughly with hot water. When the washing is complete and the material dried there is left a residue of carbon containing as a rule less than 6% and usually from about 2 to 4% of $Na_2CO_3$ which is sufficiently pure for many purposes. A continuation of the washing will reduce the $Na_2CO_3$ to a fraction of a per cent. and will eventually render the carbon substantially ash-free, except for small amounts, a fraction of a per cent., of silica and alumina. After leaching or washing, and before drying, the carbon residue will be found to contain less than 55%, and usually between 30 and 50%, of water.

A much larger yield of carbon may be obtained by calcining in a closed type of kiln in which case little or none of the carbon resulting from the cracking or breaking down of the resins, lignin, and alkali-soluble cellulose is consumed by oxidation.

The organic constituents of wood which are dissolved by the alkali used in the "soda process" include certain forms of cellulose which are soluble in sodium hydroxide solution, and various resins. The proportions of cellulose soluble in sodium hydroxide solution, and of resins, varies considerably in different kinds of wood. The sodium hydroxide-soluble cellulose is usually present in substantial proportions; the carbon obtained from wood in the above-described manner may therefore be said to consist essentially of alkali-soluble-cellulose carbon and alkali-soluble-wood-resin carbon.

The great affinity of this form of carbon for oxygen at temperatures below those at which the ordinary forms of carbons combine with oxygen makes it an efficient reducing agent by materially lowering the temperature ordinarily required for the reduction of various difficultly reducible oxides and may even bring certain reductions with carbon now only possible at temperatures of the electric furnace into the temperature ranges attainable in gas, oil or coal fired furnaces. A process of making cyanides involving this new form of carbon as a reducing agent is claimed in my application, Serial No. 309,920, filed July 10, 1919.

Although I have described above in detail the manufacture of carbon from the alkali-soluble constituents of wood, it is to be understood that by the expression "carbon obtainable by thermally decomposing the alkali-soluble constituents of wood," I mean to include carbon derived in like manner from cotton, esparto, straw, and equivalent vegetable fibers.

For technical purposes the material has numerous economical advantages over other forms of carbon. It is produced in a finely divided condition and requires no grinding previous to mixing with charges for thermo-chemical operations. It is a cheap waste product and can be obtained at a much lower cost than even coal or ordinary coke from bituminous coal. Its great chemical activity produces higher yields and shortens the time required for thermo-chemical operations, thus increasing the plant output of finished product.

On account of its low cost it is applicable to practically all thermo-chemical operations in which carbon is used, and its chemical activity and purity make it especially adapted to such operations as the treatment of alkali and alkali-earth metal compounds, the reduction of zinc compounds, the manufacture of ultramarine, of carbon bisulphide and tetrachloride and many similar operations where purity and activity of the carbon are desirable, but heretofore have not been practicable on account of the cost of carbon substantially free from non-volatile or mineral impurities.

The reactivity of the carbon is indicated by the low temperature at which it ignites with the oxygen of the air. When heated in a current of air many samples of the carbon have ignited below 150° C., and in some cases between 80 and 120° C. In a few instances an ignition temperature below 80° C. has been observed. The ordinary reactive forms of carbon heretofore known require a much higher temperature for ignition. According to Collins in "Transactions of the American Electro-chemical Society," Vol. I, (1902) page 53, amorphous carbon is consumed when heated in oxygen at from 370° to 385° C. Moissan in "The Electric Furnace," page 37, states that purified lamp black ignites in oxygen at a temperature of from 370° up to as high as 506° C., depending upon the purification treatment, calcination, temperature, etc.

The application of the new form of carbon to processes involving catalysis may be illustrated by the following examples.

1. *Manufacture of phosgene* ($COCl_2$).

A mixture of equimolecular proportions of carbon monoxide and chlorine is passed in contact with the dry carbon which is preferably maintained at a temperature of from 70 to 100° C. The reaction proceeds in accordance with the following equation:—

$$CO + Cl_2 = COCl_2.$$

Care must be taken that the gas after leaving the catalyst does not come in contact with water, since phosgene is readily decomposed thereby into carbon dioxide and hydrogen chloride.

2. *Manufacture of carbon tetrachloride.*

Phosgene is passed over the new form of carbon preferably maintained at a temperature substantially above 100° C. The phosgene is converted into carbon dioxide and carbon tetrachloride according to the following equation:—

$$2COCl_2 = CO_2 + CCl_4.$$

Other examples, in which a reaction is brought about by passing a gas or gas mixture in contact with carbon, are the production of a hydrogen halide from a mixture of hydrogen and a halogen such as chlorine; the production of sulphuryl chloride from sulphur dioxide and chlorine according to the following equation:—

$$SO_2 + Cl_2 = SO_2Cl_2;$$

the oxidation of phosphine to phosphorus pentoxide in accordance with the equation $$2PH_3 + 4O_2 = P_2O_5 + 3H_2O;$$

and the oxidation of the lower nitrogen oxides to a higher degree of oxidation.

The above examples illustrate the application of the new carbon catalyst to a process involving a reaction between a chemically active, normally gaseous metalloid, for example oxygen, chlorine, etc., on the one hand, and, on the other hand, a normally gaseous substance composed of oxygen combined with a metalloid other than oxygen, such as carbon, nitrogen, or sulphur. In more general terms my new process comprises simultaneously subjecting to the catalytic action of the carbon catalyst a chemically active metalloid and a substance, preferably in the gaseous state, whose molecule contains at least two different elements, at least one of which is a metalloid. It will be understood, however, that my invention, as regards the process, is not limited to a reaction involving the class of substances defined in the preceding sentence, but includes reactions between such simple fluid substances as hydrogen and chlorine, the catalyst in every case being the carbon hereinbefore described.

I claim:—

1. A chemical reagent comprising substantially dry carbon capable of becoming ignited in a current of air at a temperature substantially below 370° C.

2. A chemical reagent comprising substantially dry carbon capable of becoming ignited in a current of air at a temperature of from about 80° to 150° C.

3. A chemical reagent comprising carbon capable of becoming ignited in a current of air at a temperature substantially below 370° C., and containing a small percentage of an alkali-metal compound.

4. A chemical reagent comprising carbon capable of becoming ignited in a current of air at a temperature substantially below 370° C., and containing a small percentage of sodium carbonate.

5. A catalyst consisting essentially of finely subdivided carbon capable of becoming ignited in a current of air at a temperature substantially below 370° C.

6. A catalyst consisting essentially of carbon capable of becoming ignited in a current of air at a temperature substantially below 370° C., and containing a small percentage of silica and alumina.

7. A carbon catalyst having substantially the same catalytic surface activity as has carbon obtained by evaporating to dryness, and calcining, an alkali-metal hydroxide solution containing the alkali-soluble constituents of wood, to form carbon associated with an alkali-metal carbonate, and then separating said carbon from at least a large proportion of said alkali-metal carbonate.

In testimony whereof I affix my signature.

CHARLES B. JACOBS.